United States Patent
Dohrmann

(10) Patent No.: US 6,659,535 B2
(45) Date of Patent: Dec. 9, 2003

(54) IMPACT DAMPER

(75) Inventor: Wolfgang Dohrmann, Eitorf (DE)

(73) Assignee: ZF Boge GmbH, Bonn (DE)

( * ) Notice: Subject to any disclaimer, the term of this patent is extended or adjusted under 35 U.S.C. 154(b) by 0 days.

(21) Appl. No.: 10/202,379

(22) Filed: Jul. 24, 2002

(65) Prior Publication Data

US 2003/0075935 A1 Apr. 24, 2003

(30) Foreign Application Priority Data

Jul. 25, 2001 (DE) ............................ 101 36 298

(51) Int. Cl.$^7$ ................................ B60R 19/34
(52) U.S. Cl. .................. 296/133; 296/187.03; 188/377
(58) Field of Search ................ 293/132, 133; 188/371, 376, 377; 296/188, 189, 187.03

(56) References Cited

U.S. PATENT DOCUMENTS

| | | | | |
|---|---|---|---|---|
| 3,804,446 A | * | 4/1974 | Warrener .................. 293/134 |
| 4,413,856 A | * | 11/1983 | McMahan et al. .......... 296/188 |
| 4,460,206 A | * | 7/1984 | Peter ......................... 293/132 |
| 4,679,837 A | * | 7/1987 | Bayer et al. ............... 293/102 |
| 4,770,453 A | * | 9/1988 | Reynolds ................... 293/119 |
| 4,893,857 A | * | 1/1990 | Bobinger et al. ........... 293/136 |
| 4,900,076 A | * | 2/1990 | Kolb et al. ................. 293/132 |
| 4,995,486 A | * | 2/1991 | Garneweidner ............ 188/374 |
| 5,419,416 A | * | 5/1995 | Miyashita et al. .......... 188/371 |
| 5,427,214 A | * | 6/1995 | Prottengeier et al. ....... 188/374 |
| 5,468,033 A | * | 11/1995 | Dohrmann et al. ......... 293/133 |
| 5,732,801 A | * | 3/1998 | Gertz ......................... 188/377 |
| 5,884,959 A | * | 3/1999 | Hillen ........................ 293/134 |

* cited by examiner

*Primary Examiner*—Stephen T. Gordon
*Assistant Examiner*—Patricia L. Engle
(74) *Attorney, Agent, or Firm*—Cohen, Pontani, Lieberman & Pavane

(57) ABSTRACT

An impact damper as a connecting member between a bumper and a chassis of a motor vehicle for the purpose of damping the shock loading during a collision between this motor vehicle and an obstacle, predominantly through deformation work in a tube of the impact damper. The tube is connected to the chassis via a bracket and to the bumper via a bumper receptacle. The bumper receptacle, the bracket and the towing lug with the tube are connected to one another by a joining technique before they are connected to one another by a stamping operation. The advantage of the invention lies in low-cost production without compromises in terms of the functioning of the impact damper.

8 Claims, 2 Drawing Sheets

IMPACT DAMPER

BACKGROUND OF THE INVENTION

1. Field of the Invention

The invention relates to an impact damper as a connecting member between a bumper and a chassis of a motor vehicle for the purpose of damping the shock loading during a collision between this motor vehicle and an obstacle, predominantly through deformation work in a tube of the impact damper, which tube is connected to the chassis via a bracket and to the bumper via a bumper receptacle.

2. Description of the Related Art

Impact dampers of the type described are known as prior art and are intended as low-cost protection devices for the chassis of motor vehicles, which are small and light and, above all, cheap.

As regards its operation, the impact damper takes effect above a certain impact loading by virtue of the fact that it is deformed when the motor vehicle runs into an obstacle and thereby introduces the force via the bumper into the impact damper. The tube is constructed in such a way that it does not pose very much resistance to the initiation of an upsetting process. A drawn-in portion in the region of the bumper receptacle makes it easier for the tube to buckle at the beginning of the shock, its deformation resistance increasing as the deformation progresses and thus exhibiting a progressive force characteristic.

SUMMARY OF THE INVENTION

The impact damper according to the invention achieves cost savings without compromises in terms of function. For instance, it is the joining technique which can advantageously be used with the impact damper of the type proposed. Since the impact damper proposed essentially comprises the four parts—bracket, tube, bumper receptacle and towing eye—the aim in the assembly of these parts to give a unit is to reduce the number of operations to a minimum. In the region of the drawn-in portion at the bumper end of the tube, the tube has two apertures, into which the bumper receptacle is fitted. Generally, it is pressed in and secured by means of stamping operations. The towing eye too has hitherto been connected to the bumper end of the tube in a separate operation, thereby giving rise to additional expenditure. Finally, in a third operation, the bracket is connected to the tube by stamping on or caulking the chassis end of the tube.

The proposal of this invention lies in an assembly method which connects the four above-mentioned elements to one another. For this purpose, these elements in themselves are to be converted to a state which does not require any subsequent operations after assembly.

The towing eye is injection-molded from plastic to give the finished part required in the assembly method. Likewise the bracket, which, as an injection-molded plastic part has to meet similarly undemanding requirements since, here too, there are no further operations after the injection-molding process. The bumper receptacle is a portion of tube made of metal, which, in addition to an anticorrosion layer, should also have a marking in its center on the outside diameter. This marking can comprise an aperture, a dent or a noncircularity, which can be regarded as a point of contact or joining with the towing eye.

The tube—preferably composed of aluminum—has at its bumper end at least one drawn-in portion, which reduces the tube to a smaller diameter. In the region of the first drawn-in portion, the tube has two apertures, preferably holes, which allow the bumper receptacle to be arranged in such a way that the center line of the tube is perpendicular to that of the bumper receptacle. The size of the holes in the tube is such that the bumper receptacle can be fitted easily by hand. Another drawn-in portion is arranged at the bumper end in order to provide the space for the towing lug, the diameter of which must be smaller since, coaxially with the impact damper, the towing lug merely has a thread to establish the screwed joint with the towrope. Finally, the bumper end also has, as a receptacle for the towing lug, a profile, preferably a pair of internal flats, in order to arrange the towing eye, which likewise has a matching external profile, in a rotationally fixed manner in the tube. The towing eye can be fitted by hand without the aid of tools, by insertion, in the receptacle thus formed for it and, according to the invention, it has a bearing profile towards the bumper receptacle, which can enter into a joint with the above-mentioned aperture, dent or noncircularity.

For the arrangement of the bracket, it is expedient to arrange a drawn-in portion just before the chassis end of the tube to reduce the outside diameter of the tube to a smaller joining diameter, allowing the injection-molded bracket, which, in its interior, has the diameter of the tube, the drawn-in portion and the joining diameter, to be pushed onto the tube until it stops.

Since, as described, all the elements can be joined together, all that remains is to define a method to achieve permanent assembly without compromises in terms of function. This assembly method is therefore as follows:

Insertion of the tube into a stamping machine

Fitting of the bumper receptacle by insertion into the apertures of the tube

Alignment of the bumper receptacle by turning the parking in the direction of the towing eye Fitting of the towing eye by insertion into its position as defined by the flats Fitting of the bracket by pushing it onto the joining diameter on the chassis end of the tube Simultaneous flanging of the two ends of the tube while applying a preload to the towing eye to ensure a pressure at its joining location on the bumper receptacle Ejection of the finished impact damper It should also be mentioned that the bracket can be produced by encapsulating the tube. In certain circumstances, it may be a cost-effective alternative for companies which primarily process plastic. Assembly by the method described above is then no longer possible.

The object of the invention which emerges from the proposals described above is to create an extremely low-cost impact damper which, once assembled, is a finished part and requires a minimum of investment in corrosion protection and in the assembly of its components.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 1A is a cross-section of the bumper receptacle and the towing lug taken along he line A—A of FIG. 1.

DETAILED DESCRIPTION OF THE PRESENTLY PREFERRED EMBODIMENTS

Figure 1:
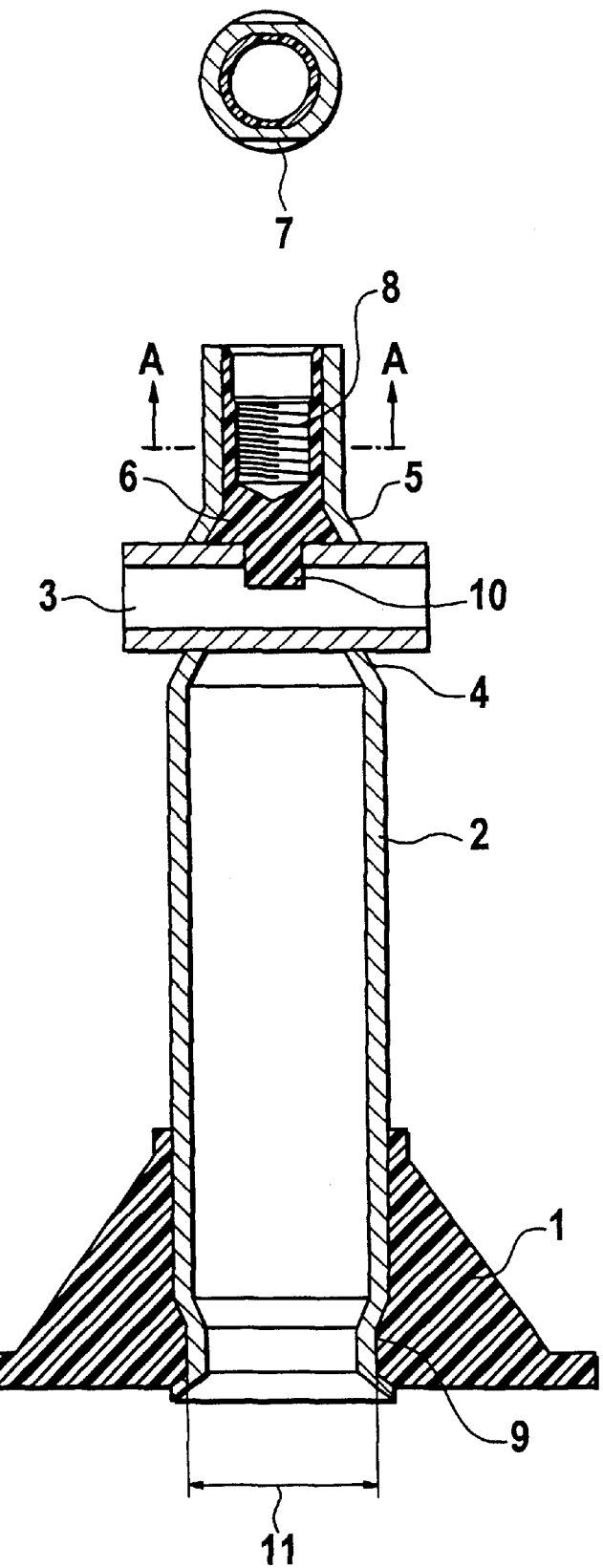
FIG. 1 is a longitudinal section of an impact damper comprising a tube, a bracket, a bumper receptacle and a towing lug.
Figure 2:
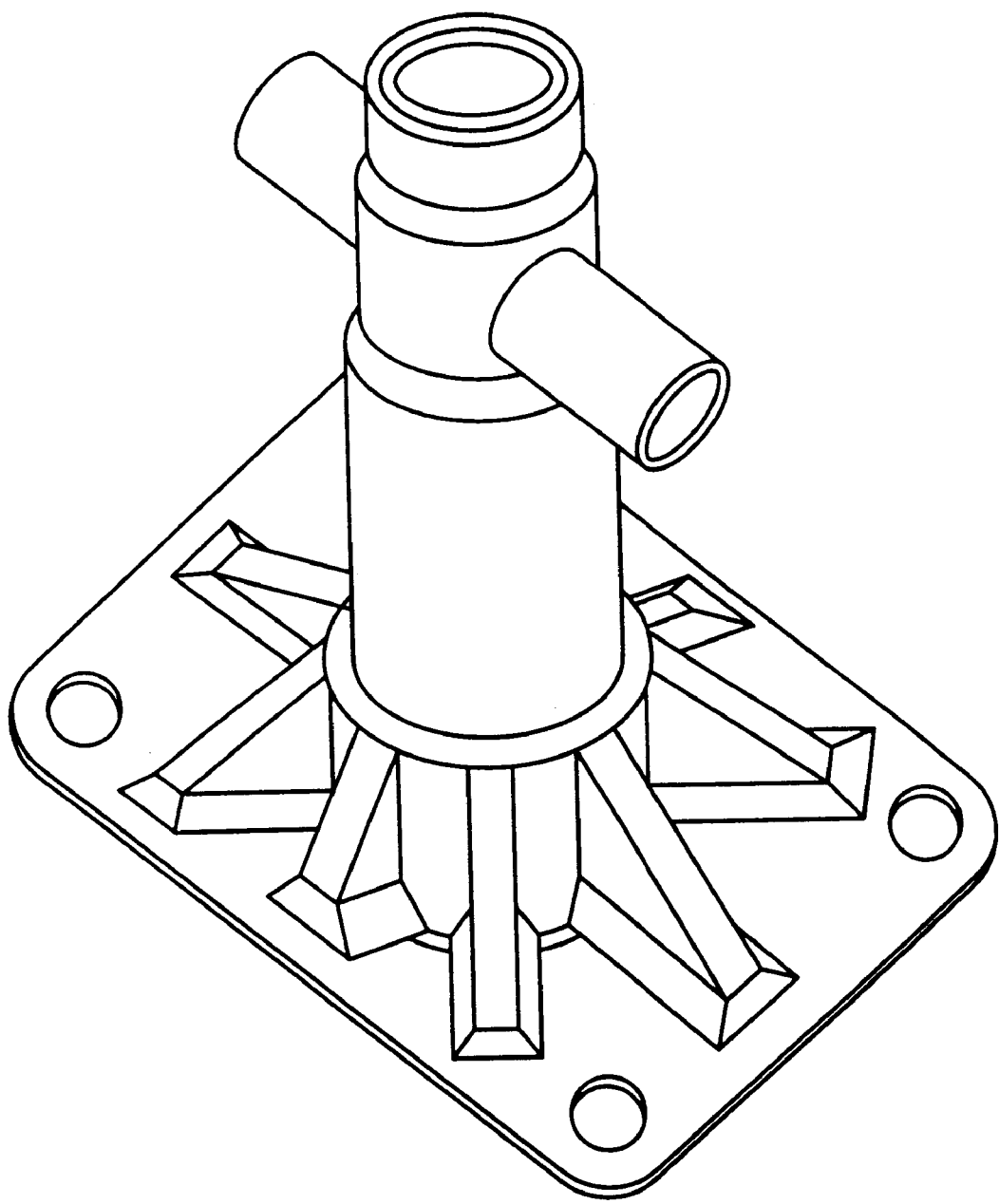
FIG. 2 is a perspective view of the impact damper.

FIG. 1 shows an impact damper comprising a bracket 1, a tube 2, a bumper receptacle 3 and a towing eye 6. The tube 2 has a first drawn-in portion 4 and a second drawn-in portion 5, which reduce the tube 2 to two respectively smaller diameters. In the region of the first drawn-in portion 4, the bumper receptacle 3 is mounted in two transverse holes in the tube 2 in such a way that the center line of the bumper receptacle 3 is perpendicular to the center line of the tube 2. As a marking, the bumper receptacle 3 has an aperture, into which a joining stud 10 of the towing eye 6 projects, thereby preventing the towing eye 6 from falling out of its seat in the tube 2. The towing lug 6 is mounted on the bumper end of the tube 2 and has a thread 8 in a coaxial direction with respect to the tube 2, where means for towing the vehicle away can be attached. The section A—A in FIG. 1A shows that the towing eye 6 has a pair of parallel flats 7, where the identical profile is likewise provided on the inside diameter of the tube 2. The tube 2 is flanged at drawn-in portion 5 and thereby holds the towing eye 6 with its joining stud 10 under permanent pressure against the bumper receptacle 3. Arranged at the chassis end of the tube 2 is a third drawn-in portion 9, which reduces the tube 2 to a joining diameter 11. As an inside diameter, the bracket 1 has the diameter of the tube 2 and has the drawn-in portion 9 and the joining diameter 11, giving accurate seating of the bracket 1 on the tube 2. The bracket 1 is secured on the tube 2 by flanging the end of the tube adjacent to the joining diameter 11.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. An impact damper for installation between a bumper and a chassis of a motor vehicle for damping shock loading during a collision between the motor vehicle and an obstacle, said impact damper comprising a tube which dampens said shock loading by deformation work, said tube having a bumper end, a chassis end, and a pair of diametrically opposed apertures, a bracket for connecting said impact damper to said chassis, said bracket having a hole which receives said chassis end of said tube, a bumper receptacle received through said apertures and joined to said tube by a joining technique, and a towing eye received in said bumper end of said tube, said towing eye comprising means for securing said bumper receptacle in said tube.

2. An impact damper as in claim 1 wherein said tube is made of aluminum and said bracket is made of plastic.

3. An impact damper as in claim 1 wherein said tube is formed with a drawn-in portion which fixes said towing eye in said bumper end of said tube and urges said towing eye against said bumper receptacle with a permanent axial pressure.

4. An impact damper as in claim 1 wherein said bumper receptacle has an aperture and said towing eye has a joining stud which engages in said aperture of said bumper receptacle.

5. An impact damper as in claim 1 wherein said tube has a drawn-in portion adjacent to the chassis end of the tube for engaging said bracket, said chassis end being formed with a flange adjacent at said chassis end of said tube for retaining said tube in said bracket.

6. An impact damper as in claim 5 wherein said bracket is made of plastic which is molded in place on said tube.

7. An impact damper as in claim 1 further comprising a towing eye received in said bumper end of said tube, said towing eye being profiled to prevent rotation in said tube, said tube having a corresponding profile.

8. An impact damper as in claim 1 further comprising a towing eye received in said bumper end of said tube, said tube, said bracket, said bumper receptacle, and said towing eye being protected against rust as individual components prior to assembly.

* * * * *